United States Patent [19]
Heller et al.

[11] 3,970,140
[45] July 20, 1976

[54] AIR OPERATED UNDERGROUND COOLER MEANS WITH NATURAL LIFT

[75] Inventors: László Heller; László Forgó; Árpád Bakay, all of Budapest, Hungary

[73] Assignee: Transelektro Magyar Villamossagi Kulkereskedelmi Vallalat, Budapest, Hungary

[22] Filed: Oct. 11, 1974

[21] Appl. No.: 514,149

Related U.S. Application Data

[63] Continuation of Ser. No. 286,515, Sept. 5, 1972, abandoned.

[30] Foreign Application Priority Data
Sept. 4, 1971  Hungary............................ EE-1961

[52] U.S. Cl.................................. 165/45; 165/129; 165/DIG. 1; 261/DIG. 11
[51] Int. Cl.² ........................................... F28B 5/00
[58] Field of Search............... 165/DIG. 1, 128, 129, 165/45; 261/DIG. 11

[56] References Cited
UNITED STATES PATENTS
3,635,042  1/1972  Spangemacher............... 165/DIG. 1
FOREIGN PATENTS OR APPLICATIONS
525,702  2/1940  United Kingdom.......... 261/DIG. 11

*Primary Examiner*—Albert W. Davis, Jr.
*Attorney, Agent, or Firm*—Blum, Moscovitz, Friedman & Kaplan

[57] ABSTRACT

The difference in density between heated and unheated air is used to provide flow of air across a heat transfer means located underground. An underground passageway connects an inlet orifice with an outlet orifice for flow of ambient air therethrough. The passageway comprises at least one essentially vertical shaft, said vertical shaft terminating at the outlet orifice and containing proximate its lower end said heat transfer means.

3 Claims, 5 Drawing Figures

AIR OPERATED UNDERGROUND COOLER MEANS WITH NATURAL LIFT

This is a continuation, of application Ser. No. 286,515, filed Sept. 5, 1972, now abandoned.

BACKGROUND OF THE INVENTION

It is known that in the course of advanced technological operations and more particularly with the production of electric energy by means of atomic or fossil fuelled power stations large amounts of heat are set free which have to be dissipated to the environment.

As a rule, such heat amounts are carried off by still or river waters though such possibilities seem to approach exhaustion and, therefore, recooling of water by means of suitable apparatus is preferred recently which transmit the heat to be dissipated to the ambiency.

Two kinds of such water recooling apparatus are known under the terms wet coolers and surface coolers, respectively. A third group is formed by what are called direct coolers which operate without the intermediary of water and in which the work medium of a plant is directly cooled down by means of air.

With wet coolers the cooling water warmed up in a power plant or in a technological process is caused to contact atmospheric air so that it partly evaporates and, thereby, cools down. The picked-up heat is transmitted by convection and particularly by evaporation to the ambiency. The cooled-down water can again be used for cooling purposes.

In case of surface coolers the warmed-up cooling water is not directly contacted with air. Instead, it flows through a cooler or heat exchanger the surface of which serves for transmitting heat to the ambient air. The cooling water is cooled down thereby and may again be made use of.

With direct cooling the work medium to be cooled down such as in most cases the steam of power plants will be supplied likewise into a cooler or heat exchanger the surfaces of which are exposed to atmospheric air.

Each of the above described cooling methods requires the circulation of considerable amounts of air which is obtained either by means of blowers driven by electric motors, or by employing towers or chimneys which make use of the natural upward drift of warm air.

With large new industrial establishments and more particularly with atomic and thermal power plants cooling towers of natural lift become increasingly important since they are solely capable to economically circulate the excessively large amounts of air required by the operation of such plants. As is known, wet cooling towers as high as 100 to 150 meters and of diameters of 100 to 120 meters have been built recently. Dry cooling towers in accordance with the system Heller, where condensation by air ("air condensation") is obtained in surface coolers or heat exchangers, have been built in similar sizes.

It is frequently required that such industrial plants or their cooling apparatus be arranged underground for reasons such as landscape conservation or prevention of potential damages due to war.

SUMMARY OF THE INVENTION

The main object of the present invention is to provide an advanced air-operated underground cooling means with natural lift in which large amounts of air may economically be circulated. The invention consists in that a heat transfer device is disposed in an underground passage between a pair of orifices opening into the ambiency, one portion of the passage downstream from the cooler forming an essentially upright outlet shaft.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE EMBODIMENTS

Figure 1:
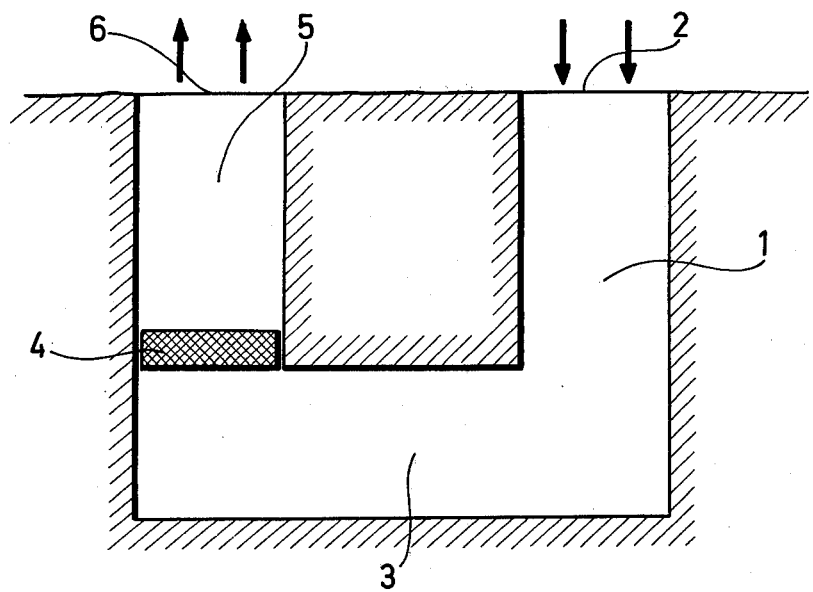
FIGS. 1 and 2 show embodiments of the invention with cooling means in an upright channel.

The invention will now be described in greater details by taking reference to the accompanying FIGS. 1 to 5 which show various embodiments of the air-operated underground cooling means according to the invention in sectional views.

In the Figures, reference character 4 designates a surface cooler or heat exchanger which is traversed by water or some other flow medium to be cooled. The cooler 4 is arranged in an underground passage between a pair of orifices, more particularly an inlet orifice 2 and an outlet orifice 6 which open into the ambiency. The portion of the underground passage downstream from the cooler 4 is formed as an upright outlet shaft 5 which is essentially vertical. In the instant case the remainder of the underground passage upstream from the cooler 4 consists of a horizontal connection channel 3 and an inlet channel 1 in the form of an upright inlet shaft which communicates with the ambiency through inlet orifice 2.

The depth and cross-sectional area of the upright outlet shaft 5 are selected to correspond to the draft required by the cooler 4. It will be seen that cooler 4 lies, in the instant case, entirely within the upright outlet shaft 5 though it might lie partly outside it as will be described hereinafter.

In operation, air required for cooling enters the upright inlet shaft or inlet channel 1 through inlet orifice 2 in a direction indicated by arrows. It flows along horizontal connection channel 3 to cooler 4 where it picks up the heat of the cooling water traversing the same and warms up. Due to its reduced specific gravity, the heated air rises through the upright outlet shaft 5. Since shaft 5 is so deep as to correspond to the draft requirement of cooler 4, an upward pressure or lift is generated therein by which the heated air is discharged from upright outlet shaft 5 through outlet orifice 6 into the ambiency as indicated by arrows. Thus, a continuous flow of cooling air is obtained without the necessity of employing special energy-consuming circulating means.

Figure 2:
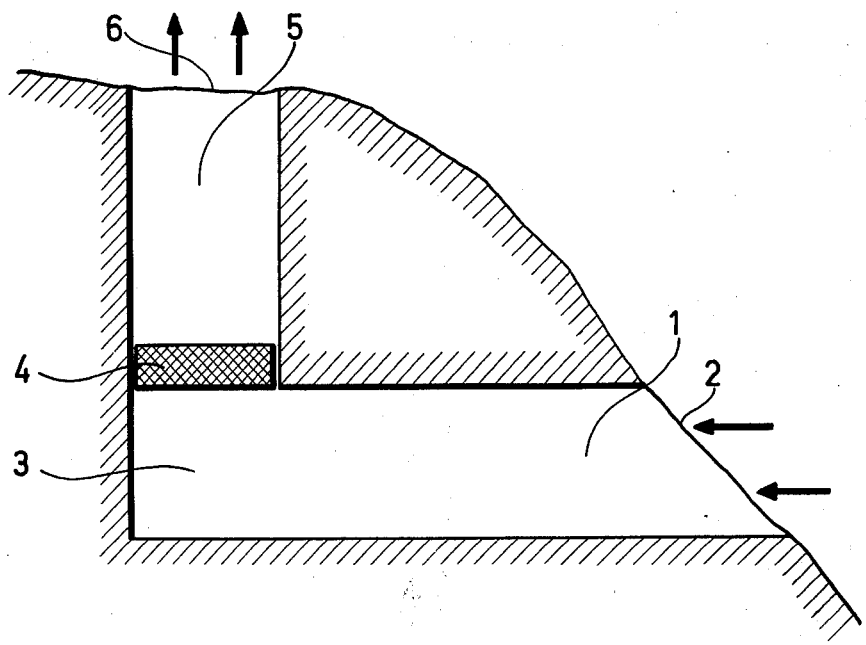

The exemplified embodiment shown in FIG. 2 differs from the previous one in that the inlet channel 1 and the connection channel 3 form parts of the same horizontal passage 1, 3 through which fresh air is introduced. Such an arrangement will preferably be employed in mountainous areas where the orifice 2 at the foot of a mountain will permit the introduction of fairly cool air while heated air may exit through outlet orifice 6 at a relatively higher level which is obviously particularly favourable for the circulation of air.

Figure 3:
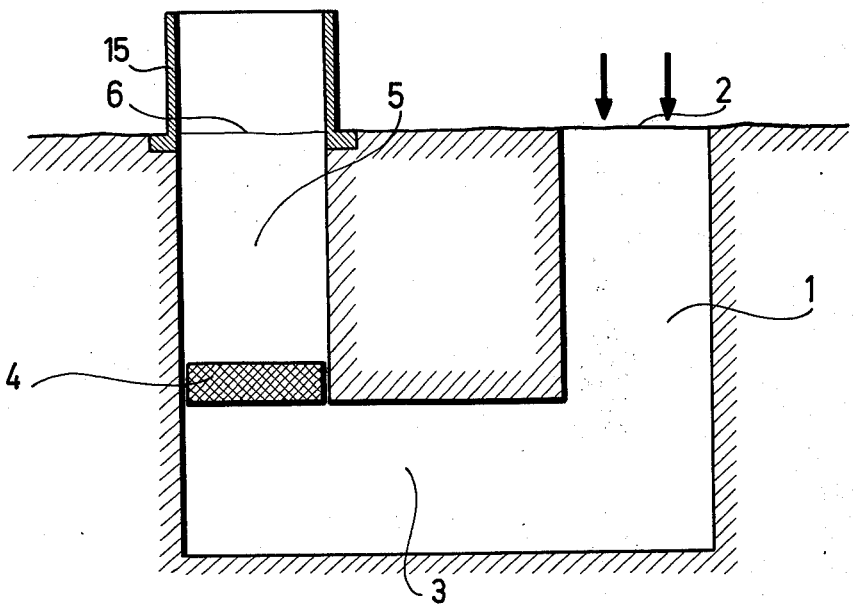
FIG. 3 shows an embodiment incorporating a chimney.

FIG. 3 illustrates an embodiment in which the constructional height at disposal is too small to accommodate an upright outlet shaft 5 which would yield a suitable lift. As shown in the drawing, in such cases an additional chimney 15 may be employed by means of which the upright outlet shaft 5 is extended to the desired length.

Figure 4:
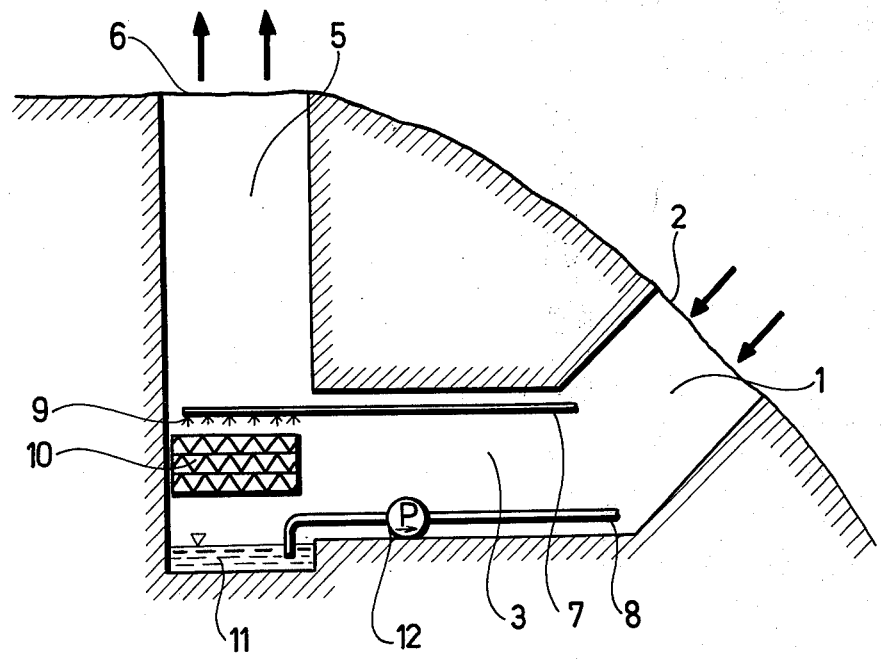
FIG. 4 shows an embodiment using evaporative cooling.

The underground cooler according to FIG. 4 represents a preferable embodiment of the invention which employs wet cooling. A warm water conduit 7 is connected to a spray device 9 which is associated with the wetted surface of a wet cooler 10. Beneath the wet cooler 10 there is a cold water collecting basin 11 from which cooled water is educted by a pump 12 through a cold water conduit 8.

In operation, the warm water is introduced through warm water conduit 7 and is forwarded to wet cooler 10 by spray device 9 whereby the water assumes the form of a water spray and cools down. The cooled down water spray is collected in cold water collecting basin 11 wherefrom it is educted through cold water conduit 8 by means of pump 12. The heat removed from the water is carried off by the upward flow of air through the shaft leading to the exit orifice 6.

Figure 5:
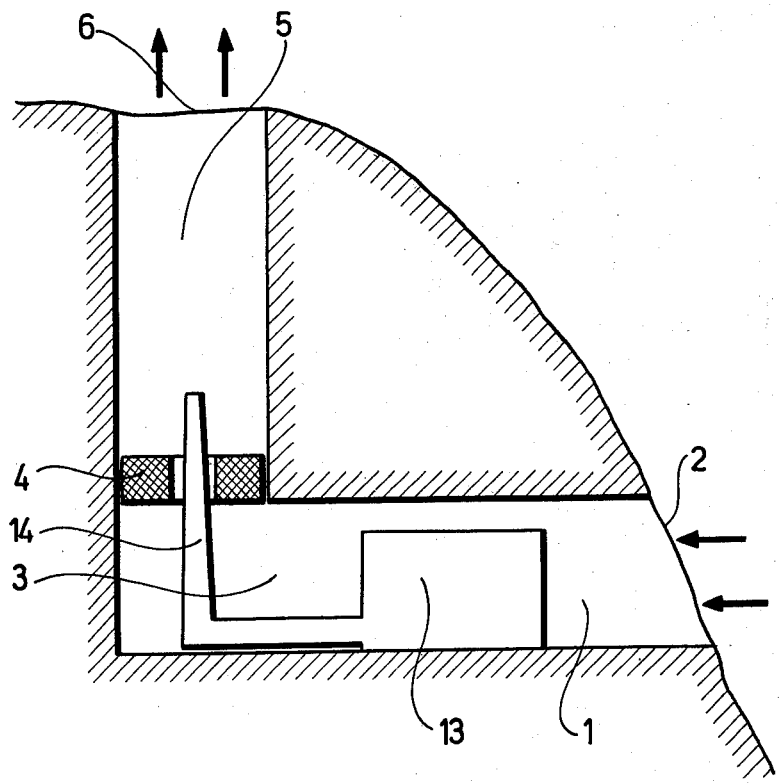
FIG. 5 shows an embodiment in which a heat-evolving plant is placed underground.

FIG. 5 illustrates an embodiment of the invention wherein a plant such as a power station 13 with which the underground cooler is associated is itself placed underground. In the instant case the power station 13 is disposed in the passage 1 and 3 consisting of the inlet channel 1 and the connection channel 3. It is assumed that the natural features are the same as in FIG. 2. The power station 13 has a chimney 14 which extends through the cooling means 4 in the essentially vertical outlet shaft 5. However, the chimney 14 might open into the upright outlet shaft 5 by bypassing the cooler 4 as well, if necessary.

The air is supplied, cooled down and educted in the same manner as was the case with the embodiment shown in FIG. 2. Combustion gases and waste products such as radioactive gases and the like of the power station 13 are exhausted by the chimney 14 directly into the upright outlet shaft 5 from which they exit into the ambiency.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An industrial plant employing cooling means dependent solely on the difference in density between heated air and unheated air for movement of air therethrough, said cooling means comprising an underground passage having an inlet orifice and an outlet orifice opening into the ambient air, said passage comprising a first essentially vertical shaft having upper and lower ends, said upper end terminating proximate said outlet orifice, a second essentially horizontal shaft having inner and outer ends, said inner end communicating with said lower end of said essentially vertical shaft, and said outer end terminating in said inlet orifice, and heat transfer means located at least in part proximate the lower end of said first shaft, the length of said first shaft being substantially greater than the length of said heat transfer means, and said heat transfer means consisting of surface cooler means extending essentially across the entire cross-sectional area of said first shaft.

2. The industrial plant employing cooling means as defined in claim 1, wherein said industrial plant is provided with a chimney for efflux of waste gases therethrough, said chimney terminating at its downstream end within said first shaft.

3. The industrial plant employing cooling means as defined in claim 2, wherein said industrial plant is disposed within at least one of said vertical and said horizontal passages.

* * * * *